Feb. 23, 1965

JAMES E. WEBB
ADMINISTRATOR OF THE NATIONAL
AERONAUTICS AND SPACE
ADMINISTRATION
LIQUID ROCKET SYSTEM
Filed July 20, 1962

3,170,290

INVENTOR.
RICHARD N. PORTER
BY
ATTORNEYS

United States Patent Office

3,170,290
Patented Feb. 23, 1965

3,170,290
LIQUID ROCKET SYSTEM
James E. Webb, Administrator of the National Aeronautics and Space Administration, with respect to an invention of Richard N. Porter
Filed July 20, 1962, Ser. No. 211,464
2 Claims. (Cl. 60—35.6)

This invention relates to liquid rocket systems, more particularly to liquid rocket systems intended for propulsion and control of space craft and included in the objects of this invention are:

First, to provide a liquid rocket system wherein the fuel and oxidizer are contained in collapsible bladders which are, in turn contained in a common pressure vessel, and wherein the pressure vessel is subjected to a pressure fluid which acts equally on both bladders to expel the fuel and oxidizer simultaneously.

Second, to provide a liquid rocket system wherein the pressure fluid is generated by a monopropellant and a catalyst and wherein the output pressure is modulated by a pressure regulator sensitive to the pressure exerted by one of the combustion constituents, that is, the fuel or the oxidizer, or if desired, by the pressurizing gas in the pressure vessel.

Third, to provide a liquid rocket system wherein a portion of the pressure fluid may be used to operate auxiliary rocket elements such as vernier or attitude control rocket elements, or to drive a fluid motor for operation of an electric power generator.

Fourth, to provide a liquid rocket system which may be utilized to operate one of a cluster of propulsion rocket motors.

With the above and other objects in view, as may appear hereinafter, reference is directed to the accompanying drawings in which.

Figure 2:
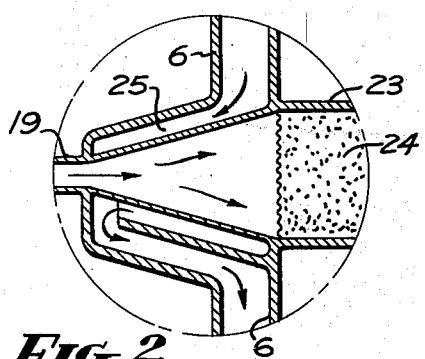
FIGURE 2 is an enlarged fragmentary sectional view taken within circle 2 of FIGURE 1.

The liquid rocket system includes a propulsion rocket motor 1 which per se is conventional. The rocket motor includes a nozzle 2 and a combustion chamber 3. Within the combustion chamber are one or more sets of fuel oxidizer injection nozzles 4 and 5.

The fuel injection nozzle or nozzles are connected to a fuel line 6 and the oxidizer injection nozzle or nozzles are connected to an oxidizer line 7. These lines are connected respectively to a fuel bladder 8 and oxidizer bladder 9. The bladders 8 and 9 are collapsible reservoirs which are formed of impregnated rubber or rubberlike material, plastic material or flexible metal which is compatible with and impervious to the fuel and the oxidizer used. The two bladders are complementary forming half spheres or half cylinders and are contained in spherical or cylindrical pressure vessel 10.

Interposed in the fuel and oxidizer lines preferably and immediately upstream from the injection nozzles 5 and 6 are remote control valves 11 and 12 which are adapted to be operated by remote control actuator or modulator 13.

The fuel or oxidizer lines 6 and 7 are provided with loading valves 14 and 15 for the purpose of introducing a fuel and an oxidizer under pressure into the bladders 8 and 9. The pressure vessel 10 is also provided with a loading valve 16 for the purpose of introducing an initial pressurizing fluid, preferably an inert gas, into the space between the bladders and the walls of the pressure vessel. The pressure of the initial pressurizing fluid may be above that of the fuel and oxidizer vapor pressure and the pressure selected may be such as to maintain the fuel and oxidizer in a liquid state.

A second pressure vessel 17 is provided. The pressure vessel contains a monopropellant bladder 18 similar in construction to the fuel and oxidizer bladders 8 and 9. A discharge line or flow line 19 leads from the monopropellant bladder 18 to the pressure vessel or chamber 10 externally of the bladders 8 and 9.

Interposed in the discharge or flow line 19 is an explosive or remote control valve 20 which is employed to initiate operation of the liquid rocket system.

Downstream from the initiating valve 20 is a regulator valve 21 having a pressure sensing line 22 communicating with either the fuel line 6 or the oxidizer line 7 or the gas filled space in the pressure vessel 10. The pressure regulated monopropellant flows from the regulator 21 through a catalyst chamber 23 containing a catalyst 24. By reason of the fact that, for example, after a firing period has been completed and valve 20 closed, the temperature of the catalyst and metal parts of the gas generator 23 may heat the monopropellant remaining between the valve 20 and catalyst 24 until the monopropellant explodes, some cooling of the injector of the gas generator may be obtained by means of a heat exchange jacket 25 illustrated particularly in FIGURE 2.

In the course of passing through the catalyst chamber 23 the monopropellant is heated and chemically decomposed to gases. Some of this heat may be transferred to the oxidizer line 7, or the fuel line 6, by means of a heat exchange coil 26 interposed in the monopropellant discharge or flow line 19 between the catalyst chamber 23 and the pressure chamber or vessel 10.

The pressure vessel 17 is equipped with a loading valve 27 for the introduction of a pressurizing-fluid and the discharge line 19 upstream from the initiating valve 20 is provided with a loading valve 28.

Operation of the liquid rocket system is as follows:
The loading valves are utilized to introduce fuel, oxidizer and monopropellant into their respective bladders 8, 9 and 18. Various fuels may be used, for example:

Hydratine, monomethyl hydratine, unsymmetrical dimethyl hydratine, per mixtures of these fuels.

Various oxidizers may be used, for example:

Nitrogen tetroxide, mixtures of nitrogen tetroxide and nitric oxide, fuming nitric acid, and hydrogen peroxide.

Various monopropellants may be used, for example:

Hydratine, hydrogen peroxide.

Various catalyzers may be used, some of which are classified; however, a catalyzer formed of iron, nickel and cobalt deposited on aluminum oxide pellets may be used. The initial pressurizing fluid introduced between the bladders and the pressure vessels 10 or 17 may be an inert gas, for example; nitrogen or helium.

The initial pressures utilized in the bladders and in the pressure vessels depend upon the fuel, oxidizer and monopropellant used and other factors such as the intended operating period of the system. By way of example but not of limitation, the initial pressure within the pressure chamber 10 may be in the range of 200 to 250 pounds per square inch and the initial pressure in the pressure vessel 17 may be in the order of 1000 to 1500 pounds per square inch.

When it is desired to initiate operation of the liquid rocket system, the explosive or remote control valve 20 is opened and the valves 11 and 12 controlling flow to the injection nozzles 4 and 5 are opened. The monopropellant passes through the regulator valve and at a regulated flow rate enters the catalyst chamber 23 where it is caused by the catalyst to become heated and decomposed to gases. The hot gases flow through the heat exchange coil 26, where they are cooled, and into the pressure vessel 10 to maintain a collapsing pressure on both of the bladders 8 and 9.

Because the bladders are contained within the common vessel, their internal pressures are equal to each other. The rate of flow of fuel and oxidizer is determined by the control valves 11 and 12. If the control valves are closed, pressure builds up equally in both the fuel and oxidizer lines causing the regulator valve to reduce the flow of monopropellant pressurizing fluid. The pressure in the fuel and oxidizer lines are maintained within an optimum range whether the control valves 11 and 12 are fully opened or throttled or completely shut off. The actuator or modulator 13 is therefor capable of controlling the thrust of the liquid rocket motor 1.

Figure 1:
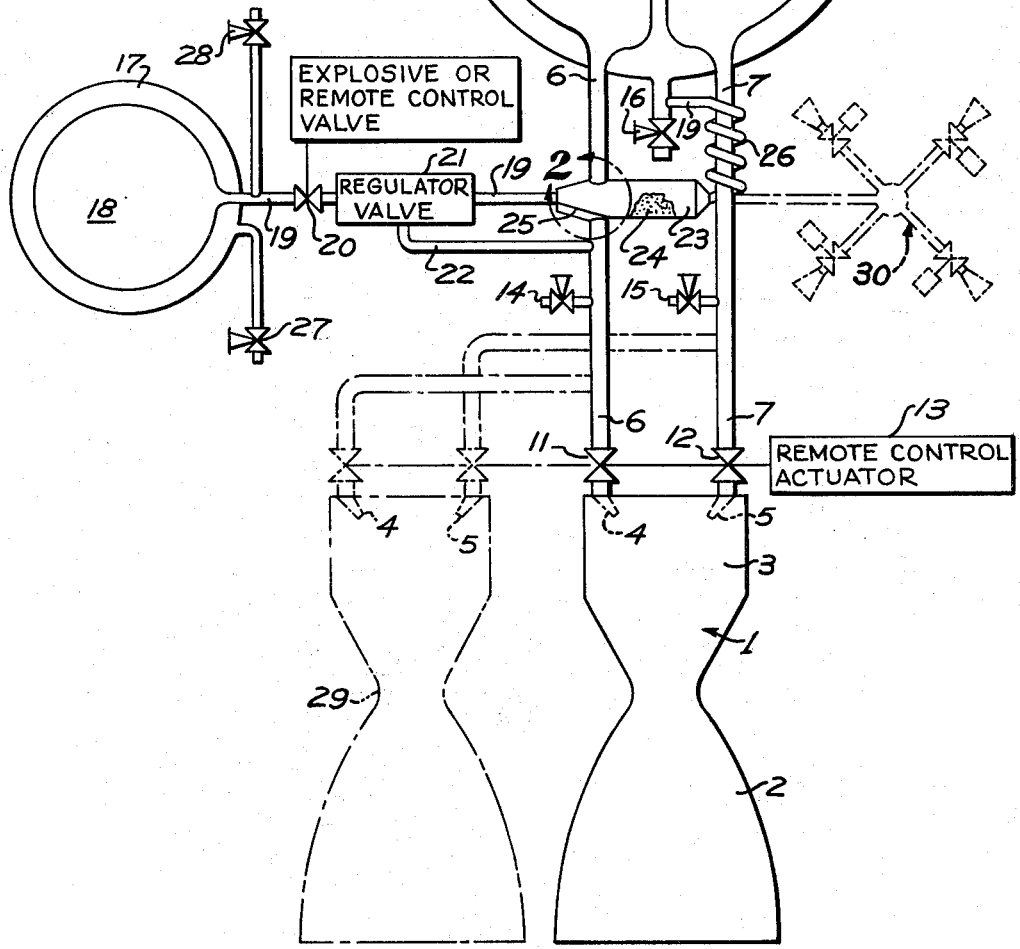
FIGURE 1 is a diagrammatical view illustrating the liquid rocket system.

The fuel and oxidizer lines 6 and 7 need not be connected to a single propulsion rocket but many have branch lines connected to additional propulsion rocket motors, for example the rocket motor 29 indicated by broken lines in FIGURE 1.

It is sometimes desirable to operate auxiliary rocket motor units, for example attitude control rocket motor units. These auxiliary rocket motor units such as those indicated by broken lines 30 in FIGURE 1 may utilize excess monopropellant.

While particular embodiments of this invention have been shown and described, it is not intended to limit the same to the exact details of the construction set forth, and it embraces such changes, modifications, and equivalents of the parts and their formation and arrangement as come within the purview of the appended claims.

What is claimed is:
1. In a liquid rocket system having a rocket motor, collapsible fuel and oxidizer reservoirs contained within a common pressure vessel and connected by supply lines to said rocket motor, the combination of a pressure fluid generator comprising:
   (a) a reservoir containing a monopropellant under pressure;
   (b) a flow line from said monopropellant reservoir to said pressure vessel;
   (c) a catalyst means interposed in said flow line;
   (d) heat exchange means for the monopropellant at the entrance end of said catalyst means interposed in a selected supply line;
   (e) and a pressure regulator upstream from said catalyst means and subject to pressure in a selected supply line.

2. In a liquid rocket system having a rocket motor, collapsible fuel and oxidizer reservoirs contained within a common pressure vessel and connected by supply lines to said rocket motor, the combination of a pressure fluid generator comprising:
   (a) a reservoir containing a monopropellant under pressure;
   (b) a flow line from said monopropellant reservoir to said pressure vessel;
   (c) a catalyst means interposed in said flow line;
   (d) heat exchange means for the monopropellant at the entrance end of said catalyst means interposed in a selected supply line;
   (e) a second heat exchange means incorporating said monopropellant flow line downstream from said catalyst means and a selected supply line;
   (f) and a pressure regulator upstream from said catalyst means and subject to pressure in a selected supply line.

References Cited by the Examiner
UNITED STATES PATENTS

| | | | |
|---|---|---|---|
| 2,394,852 | 2/46 | Goddard. | |
| 2,816,417 | 12/57 | Bloomberg | 60—35.6 |
| 2,949,007 | 8/60 | Aldrich et al. | 60—35.6 |
| 3,029,598 | 4/62 | Saltarelli et al. | 60—35.6 X |
| 3,099,133 | 7/63 | Singelmann | 60—35.5 |

SAMUEL LEVINE, *Primary Examiner.*
JULIUS E. WEST, *Examiner.*